Aug. 29, 1967 G. G. PICK 3,339,184

ZENER DIODE MEMORY PLANE BIASING CIRCUIT

Filed Sept. 14, 1964

INVENTOR
GEORGE G. PICK

BY [signature]

ATTORNEY 3,339,184

ZENER DIODE MEMORY PLANE BIASING CIRCUIT

George G. Pick, Lexington, Mass., assignor to Sylvania Electric Products Inc., a corporation of Delaware Filed Sept. 14, 1964, Ser. No. 396,203
6 Claims. (Cl. 340—173)

This invention relates to semi-permanent memory systems and more particularly to means for increasing the speed of such systems.

A memory system is disclosed in copending application Ser. No. 334,413, filed Dec. 30, 1963, now Pat. No. 3,299,412 and assigned to the assignee of the present application, wherein an array of solenoids is employed in conjunction with a plurality of thin data planes to provide a permanent, mechanically alterable, random access memory. This memory system is described in detail in the above-identified copending application, and will be described herein only insofar as necessary to understand the present invention. Briefly, the system comprises a plurality of data planes, stacked one upon the other, each storing its own coded address and data word, and a plurality of elongated solenoids which pass through aligned openings in all of the planes. The address of each plane is stored on the plane by selectively arranging a plurality of etched coils which either surround or by-pass a like plurality of addressing solenoids in accordance with an address code. The addressing solenoids are energized in pairs to minimize the effects of stray magnetic flux. The data storage portion of each plane has a plurality of similar etched coils each arranged to surround or by-pass respective storage solenoids to represent a bit of a stored word. A surrounding path represents a ONE while a by-pass path represents a ZERO. The coils on the address portion of the plane and those on the data portion of the plane are connected in a series path through a diode.

When a word is to be read out of the memory, the addressing solenoids are energized in accordance with the address of the particular plane. The windings of these solenoids act as transformer primaries while each of the surrounding coils act as secondaries. The address code is arranged so that only the plane storing the correct address will produce a summation of positive signals in the address portion of the plane, with all others producing a null or negative signal. Accordingly, only the correct plane forward-biases its diode and allows current to flow in the data storage portion of the plane. The coils on the storage portion of the plane act as transformer primaries while their solenoid windings act as secondaries. The signals sensed by the solenoids passing through the data portion of the planes represent the data content of the particular plane. While this memory system performs admirably for many applications, it has an inherent shortcoming which limits its operating speed. This disadvantage arises from an inductive overshoot of the drive solenoids which induces voltages in the unselected data planes or sufficient magnitude to forward bias the diodes associated with these planes, causing them to conduct. A transient condition is thus established in the unselected planes which takes several microseconds to settle, thereby slowing down the cycle time between addressing signals. It is, therefore, an object of the present invention to eliminate this transient condition to thereby increase the operating speed of the memory.

Briefly, this object is attained according to the invention by a breakdown diode, such as a Zener diode, connected in series with the diode presently employed in the data planes, and means for biasing the planes such that the transient voltages induced in the unselected planes by inductive overshoot are below the Zener reference voltage. The unselected planes are not energized since the diode-Zener diode combination on these planes is not conducting. The voltage induced in the selected data plane is, however, greater than the reference voltage, causing the diode-Zener diode combination thereof to conduct, thereby energizing the storage portion of the selected plane.

The foregoing together with other objects, features and advantages of the invention will be more fully understood from the following detailed description, taken in conjunction with the drawings, in which.

Figure 1:
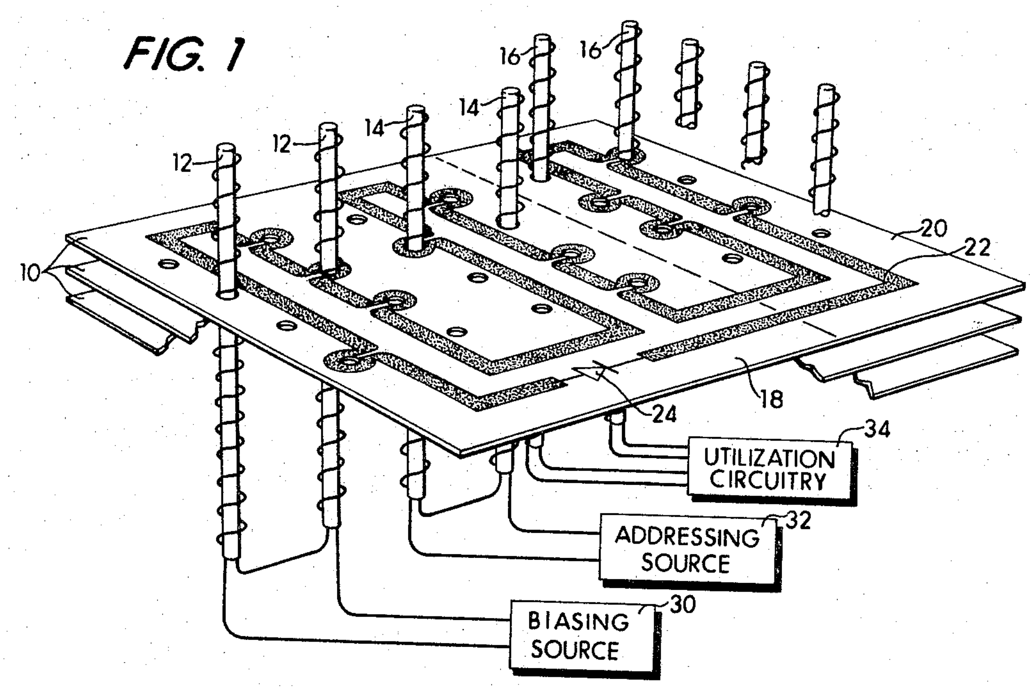
FIG. 1 is a fragmentary pictorial view of a memory system of the type in which the invention finds application.

A memory system of the type disclosed in the above-identified copending application is illustrated in FIG. 1. This memory comprises a plurality of data planes 10, formed, for example, of thin plastic sheet material such as "Mylar," stacked one upon the other, and a plurality of solenoids 12, 14 and 16 disposed normal to the planes and passing through corresponding holes in the planes. Each data plane includes an address section 18, a storage section 20 and a series conductive path 22 arranged to surround or by-pass selected holes in both the address and the storage section. The conductive path is formed, typically, by well known etched circuit techniques. Data is represented by the surrounding paths and the py-pass paths which represent ONES and ZEROS, respectively. The biasing solenoids 12 and the addressing solenoids 14 passing through corresponding holes in the address section of the plane are arranged in pairs with the solenoid windings of each pair producing fields of opposite polarity to minimize stray magnetic flux which would tend to introduce unwanted voltages in the conductive path. Solenoids 12 are provided to apply an appropriate bias to conductive path 22 to adjust the operating voltage level, for reasons to be explained hereinafter. Alternatively, appropriate biasing can be accomplished by means of an addressing code designed to provide the requisite operating voltages. A diode 24 is connected in series with the conductive path 22 and is chosen to have a forward bias voltage such that it is energized only when the particular plane is suitably addressed. The addressing solenoids 14 act as transformer primaries while the surrounding paths of conductive path 22 act as transformer secondaries. Thus, when the addressing solenoids and biasing solenoids are energized, via respective sources 30 and 32, a voltage is induced in the surrounding coils associated with the energized solenoids, the sum of which is representative of the coded address. The address code is arranged so that a signal is generated of sufficient magnitude to forward bias diode 24 only when the particular plane in question is addressed. The voltages induced in the unaddressed planes are negative and therefore do not forward bias the diode; thus no current flows in the conductive path of the unselected planes. When diode 24 on the selected plane is forward biased, current flows in conductive path 22 to the coils surrounding the holes in the storage section of the plane. These surrounding coils act as transformer primaries, while the solenoids passing through the storage section act as transformer secondaries. A voltage is, therefore, induced in the solenoids associated with the surrounding coils, each solenoid producing a signal which is representative of one bit of a data word stored on the storage section of the plane. The coded data word is applied to utilization circuitry 34 for subsequent processing. For the sake of simplicity, a data plane containing only one data word is illustrated; it is to be understood, however, that a plurality of data words can be stored on a single plane in a more elaborate embodiment.

As is well known, inductive overshoot occurs in an inductor when an energizing signal is removed. In the memory system under discussion such an overshoot occurs in the drive solenoids which induces spurious voltages in the unselected planes which, in turn, cause diodes in some of these planes to conduct. These spurious transient voltages cause currents to flow in the unselected planes, which require several microseconds to decay during which time further data cannot be read out. The speed of the memory is, therefore, greatly reduced due to this deleterious condition. As has been discussed, the address code and bias are chosen to that only the voltage induced in the selected plane is sufficient to forward bias its diode. The voltages induced in the unselected planes are negative and therefore do not cause the corresponding diodes to conduct. Due to inductive overshoot, however, the induced voltages reverse polarity, many then being of sufficient magnitude and proper polarity to forward bias the diodes of some unselected planes.

Figure 2:
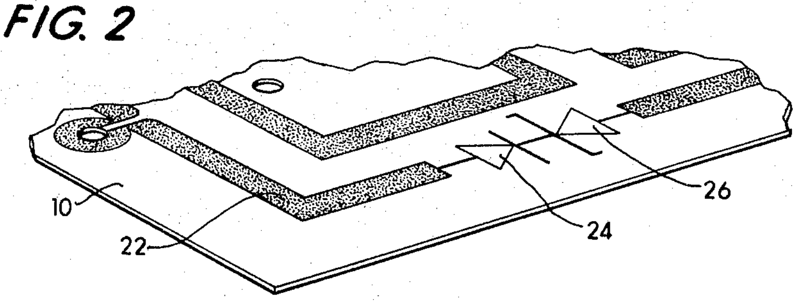
FIG. 2 is a pictorial view of a fragmentary portion of a data plane embodying the invention.

In accordance with the present invention, this transient condition is eliminated by inserting a breakdown diode, such as a Zener diode 26 (shown in FIG. 2), in series with the diode 24 presently employed in the conductive path of each data plane, and adjusting the drive bias so that the diode-Zener diode combination conducts only on the selected plane. The bias is chosen such that the voltages induced in the unselected planes are symmetrically distributed about a zero reference point, say from +V to —V volts. During inductive overshoot, these induced voltages reverse polarity; however, the distribution of the voltages remains between +V and —V volts since the voltages are symmetrically distributed. It will be appreciated that if the voltage induced in the selected plane were some value above +V volts, and means were provided which were responsive only to this larger voltage, then transients would not occur in the unselected planes since only the larger voltage in the selected plane would be operative to energize that plane.

Figure 3:
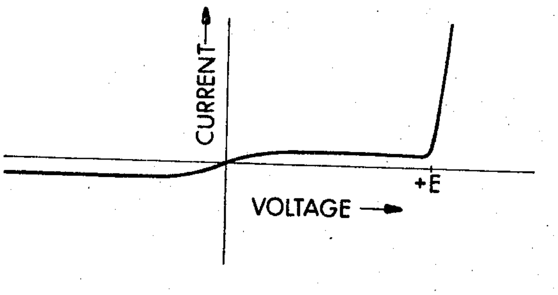
FIG. 3 is a curve depicting the current-voltage characteristic of a diode-Zener diode combination employed in the invention.

It has been found that a Zener diode connected in series with a conventional diode, such as presently used in the conductive path of each data plane, provides the requisite voltage characteristic to pass only signals which are above a reference potential. The series combination of a diode and Zener diode has a current-voltage characteristic illustrated in FIG. 3. As seen from this figure, the diode combination is substantially non-conducting until a reference potential E is reached, at which time the Zener diode breaks down and conducts. Thus, the transient condition can be eliminated by biasing the unselected data planes so that the unselected voltages are symmetrically distributed between limits, the positive limit of which is less than the reference potential E. The voltage induced in the selected plane is chosen to have a value of E or above; therefore, only this selected voltage causes the diode-Zener diode combination to conduct. The Zener diode and diode are chosen such that the sum of the diode forward conduction voltage drop and the Zener breakdown voltage equals a voltage which is higher than the positive limit of the symmetrical distribution of the unselected voltages.

In a memory system constructed according to the invention, the bias was chosen to produce voltages in the unselected planes in the range between +6 and —6 volts, while the voltage induced in the selected plane was chosen to be +11 volts. A Zener diode was employed having a breakdown voltage of +7 volts. The diode-Zener diode combination can be provided in a single device containing two diodes, not unlike a transistor with no base connection. The "collector" junction is the diode while the "emitter" junction is the Zener diode. Alternatively, a separate Zener diode can be connected in series with a conventional diode to provide the composite device.

From the foregoing, it is evident that a simple, extremely effective means has been provided for eliminating transient effects in a memory system, and, consequently, increasing the speed of such a system. It is to be understood that the embodiments particularly shown and described are illustrative only and are not to limit the scope of the invention except as indicated in the appended claims.

What is claimed is:

1. In a memory system which includes a plurality of data planes stacked one upon the other, each having a plurality of holes therein and a closed conductive path surrounding selected ones of said holes and a diode connected in series with said closed path, and a plurality of solenoids passing through corresponding holes in said planes and in coupling relationship with portions of said conductive path, the improvement comprising; means for eliminating spurious voltages in said planes comprising, a Zener diode having a reference voltage greater than the maximum expected amplitude of said spurious voltages connected in series with said diode and said conductive path, and means for biasing said planes to induce a voltage in the conductive path on only a selected one of said planes which exceeds said reference voltage.

2. In a memory system which includes a plurality of data planes stacked one upon the other, each having a plurality of holes therein and a closed conductive path surrounding selected ones of said holes and a diode connected in series in said closed path, and a plurality of solenoids passing through corresponding holes in said planes and in coupling relationship with portions of said conductive path, the improvement comprising; means for eliminating spurious voltages in said planes comprising, a Zener diode connected in series with said diode in said conductive path, said Zener diode having a reference voltage greater than the maximum expected amplitude of said spurious voltages, and means for biasing said planes operative to induce voltages in the conductive paths of all except a selected one of said planes of smaller amplitude than said reference voltage and to induce a voltage in said selected plane of greater amplitude than said reference voltage.

3. In a memory system which includes a plurality of data planes stacked one upon the other, each having a plurality of holes therein and a closed conductive path surrounding selected ones of said holes, and a plurality of solenoids passing through corresponding holes in said planes and in coupling relationship with portions of the conductive path on each of said planes, the improvement comprising; means for eliminating spurious voltages in said planes comprising, a diode and a Zener diode connected in series in said closed path, said diode-Zener diode combination having a combined forward conduction voltage greater than the maximum expected amplitude to said spurious voltages, and means for biasing said planes operative to induce a voltage in the conductive path on only a selected one of said planes which is greater than said combined forward conduction voltage.

4. In a memory system which includes a plurality of data planes stacked one upon the other, each having a plurality of holes therein and a closed conductive path surrounding selected ones of said holes, and a plurality of solenoids passing through corresponding holes in said planes and in coupling relationship with portions of the conductive path on each of said planes, the improvement comprising; means for eliminating spurious voltages in said planes comprising, a diode and a Zener diode connected in series in said closed path, said diode-Zener diode combination having a combined forward conduction voltage greater than the maximum expected amplitude of said spurious voltages, means for inducing voltages in the conductive path of all except a selected one of said planes which are symmetrically distributed about a zero reference point and which are less than said combined forward conduction voltage, and means for inducing a voltage in said selected plane greater than said combined forward conduction voltage.

5. In a memory system which includes a plurality of data planes stacked one upon the other, a plurality of solenoids passing through corresponding holes in said planes and operative to induce a specified voltage in a selected plane, and biasing means to adjust the operating level of said system, the improvement comprising; data planes which are not responsive to spurious voltages caused by inductive overshoot in said solenoids each of which comprises, a plastic sheet having a plurality of holes therein and a conductive path which surrounds selected ones of said holes, and a diode and a Zener diode connected in series with said path, said diode-Zener diode combination having a combined forward conduction voltage greater than the maximum expected amplitude of said spurious voltages but less than the amplitude of the specified voltage induced in said selected plane.

6. In a memory system which includes a plurality of data planes stacked one upon the other, a plurality of solenoids passing through corresponding holes in said planes and operative to induce a specified voltage in a selected plane, and biasing means to adjust the operating level of said system, the improvement comprising; data planes which are not responsive to spurious voltages caused by inductive overshoot in said solenoids each of which comprises, a plastic sheet having a plurality of holes therein and a conductive path which surrounds selected ones of said holes, and a diode and a breakdown diode connected in series with said path, said diode-breakdown diode combination having a combined forward conduction voltage greater than the maximum expected amplitude of said spurious voltages but less than the amplitude of the specified voltage induced in said selected plane.

References Cited

UNITED STATES PATENTS

| | | | |
|---|---|---|---|
| 3,142,823 | 7/1964 | Lewin et al. | 340—173 |
| 3,245,058 | 4/1966 | Bruce | 340—173 X |
| 3,290,512 | 12/1966 | Tillman et al. | 340—174 |

BERNARD KONICK, *Primary Examiner.*

J. BREIMAYER, *Assistant Examiner.*